United States Patent
Blaufuss

(10) Patent No.: US 8,981,953 B2
(45) Date of Patent: Mar. 17, 2015

(54) PROTECTION MODULE FOR MONITORING THE POSITION OF OBJECTS

(75) Inventor: Jean Blaufuss, Gräfelfing (DE)

(73) Assignee: CargoGuard GmbH, Munich (DE)

( * ) Notice: Subject to any disclaimer, the term of this patent is extended or adjusted under 35 U.S.C. 154(b) by 31 days.

(21) Appl. No.: 13/700,870

(22) PCT Filed: Jun. 3, 2011

(86) PCT No.: PCT/EP2011/002740
§ 371 (c)(1),
(2), (4) Date: Feb. 1, 2013

(87) PCT Pub. No.: WO2011/151077
PCT Pub. Date: Dec. 8, 2011

(65) Prior Publication Data
US 2013/0127628 A1  May 23, 2013

(30) Foreign Application Priority Data
Jun. 2, 2010 (DE) .................. 10 2010 029 671

(51) Int. Cl.
*G08B 21/00* (2006.01)
*G08B 1/08* (2006.01)
*G06Q 10/08* (2012.01)
*G07C 9/00* (2006.01)
*G08G 1/00* (2006.01)

(52) U.S. Cl.
CPC ............ *G08B 21/00* (2013.01); *G06Q 10/0833* (2013.01); *G07C 9/00166* (2013.01); *G08G 1/205* (2013.01)
USPC .................................. 340/686.1; 340/539.13

(58) Field of Classification Search
USPC ................. 340/426.13, 539.13, 572.1–572.9, 340/686.1; 70/63
See application file for complete search history.

(56) References Cited

U.S. PATENT DOCUMENTS

| | | | |
|---|---|---|---|
| 5,804,810 A * | 9/1998 | Woolley et al. ................ 235/492 |
| 8,686,861 B2 * | 4/2014 | Chung et al. ................ 340/572.8 |
| 2004/0069850 A1 * | 4/2004 | De Wilde ....................... 235/385 |
| 2004/0223660 A1 * | 11/2004 | Zank et al. ..................... 382/277 |
| 2005/0210302 A1 * | 9/2005 | Kato et al. .................... 713/320 |
| 2005/0248444 A1 * | 11/2005 | Joao .......................... 340/426.13 |
| 2007/0109097 A1 * | 5/2007 | Coutermarsh et al. ....... 340/5.73 |
| 2008/0061963 A1 | 3/2008 | Schnitz |

(Continued)

FOREIGN PATENT DOCUMENTS

| DE | 10 2008 033731 A1 | 1/2010 |
| WO | WO2009111734 A2 | 9/2009 |

OTHER PUBLICATIONS

European Patent Office (ISA/EP), International Search Report from corresponding PCT application (PCT/EP2011/002740) as completed on Oct. 10, 2011 (total 6 pages).

*Primary Examiner* — Van T. Trieu
*Assistant Examiner* — Royit Yu
(74) *Attorney, Agent, or Firm* — Hiscock & Barclay, LLP

(57) ABSTRACT

The invention relates to a protection module (1), a system and a method for monitoring objects, wherein a protection module (1) comprises, a locating module (11) for acquiring position data of the protection module and a communication unit (12) which can send data to a monitoring device (2), wherein the protection module (1) is suitable for being placed into an alarm state by an alarm signal and in the alarm state, sending position data to the monitoring device (2) in a particular alarm interval or continuously.

7 Claims, 10 Drawing Sheets

(56) References Cited

U.S. PATENT DOCUMENTS

| | | | |
|---|---|---|---|
| 2008/0201076 A1* | 8/2008 | Huang et al. | 701/213 |
| 2008/0297346 A1 | 12/2008 | Brackmann | |
| 2008/0316023 A1* | 12/2008 | Crowl et al. | 340/539.13 |
| 2009/0174548 A1* | 7/2009 | Chan et al. | 340/539.13 |
| 2010/0188287 A1* | 7/2010 | Madsen et al. | 342/357.07 |
| 2010/0229248 A1* | 9/2010 | Glave | 726/34 |
| 2010/0327999 A1* | 12/2010 | Woods | 335/206 |
| 2011/0005282 A1* | 1/2011 | Powers et al. | 70/63 |
| 2011/0068921 A1* | 3/2011 | Shafer | 340/571 |
| 2011/0156910 A1* | 6/2011 | Pieper et al. | 340/572.7 |
| 2013/0066544 A1* | 3/2013 | Curatolo et al. | 701/300 |
| 2014/0028455 A1* | 1/2014 | Eisenman | 340/539.13 |

* cited by examiner

PROTECTION MODULE FOR MONITORING THE POSITION OF OBJECTS

The invention relates to a protection module, a system and a method for monitoring objects. By means of the present invention, especially the position of objects can be monitored.

In the shipping industry, goods or objects to be transported are sent from a sender to a receiver. To protect the objects against theft during the transportation, transport containers such as, for example, containers are used in which the objects are transported. These can be provided with a locking device such as, for example, an electrical or mechanical security lock. This is intended to prevent that the objects can be stolen from the transport container. However, if such a locking device is broken open or the entire transport container is stolen, the objects are often lost irretrievably. It is especially in the case of widely used objects, that it is difficult to retrieve a stolen object or to track and convict the thief, respectively. Even if serial numbers of the objects are registered before transportation, all objects of the same type would then have to be checked for these. It is especially in the case of transportations of valuables that, therefore, a great effort is frequently made in order to prevent unauthorized access or theft, for example by employing security personnel and armored vehicles. However, this is extremely complex and expensive. In addition, these conventional security provisions only represent preventative measures and do not offer any additional protection if there is a contingency, nevertheless. In addition, this will not prevent theft of the transported objects by the security personnel.

DE 10 2008 033 731 describes a security lock which can be equipped with a position sensor and conveys its position to a server at fixed times. However, the position is conveyed only for as long as there is sufficient battery capacity. In addition, when the transport container is emptied, only its position can be ascertained but not the position of the object removed from the transport container.

It is the object of the present invention, therefore, to provide a system and a method for monitoring objects with increased security, wherein protection against misuse, manipulation and theft is implemented cost-effectively and stolen property can be found again.

This object is achieved by the features of the independent claims. The invention is based on the concept of allocating or adding a protection module to one or more objects to be monitored so that it cannot be easily recognized. The protection module comprises a locating module for determining position data and a communication unit by means of which the position data can be sent to a monitoring device. The protection module can be placed into an alarm state by an alarm signal supplied, in which state it transmits the position data to the monitoring device either continuously or in a so-called alarm interval. The protection module is preferably switched into an active state before the beginning of the monitoring so that it is ready for reception and can receive an alarm signal. This can be effected by the user by means of an on button. The alarm signal can be sent to the protection module either by the monitoring device or by other protection devices which are allocated to the same object or objects to be monitored, e.g. by security locks or other protection modules.

In one exemplary embodiment, this protection module sends data to the monitoring device only in the alarm state. Position data are preferably also determined only in this alarm state. This is advantageous especially with regard to the power consumption and a limited voltage supply. However, it is preferred that the protection module sends determined position data and/or other data to the monitoring device at regular time intervals also in the normal monitoring state or in the active state. The transmitting interval is preferably greater in the active state than the alarm interval. By this means, it is possible to check the operability of the protection module or the existence of a communicative link between the protection module and the monitoring device, respectively. The transmitting interval can preferably be adapted to external situations. For example, the alarm interval can be adapted to a battery charging state of the protection module. As an alternative or additionally, the transmitting interval can be adjusted by the user via the monitoring device in the active state or alarm state. The protection module can also be preset in such a manner that the transmitting interval is matched to the embodiment and its intended use. In particular, it is advantageous if the protection module, in the alarm state, firstly sends position data continuously to the monitoring device until a supply voltage or a battery charging state has dropped to a predetermined value, and then sends position data to the monitoring device in an adjustable or predetermined alarm interval. In this embodiment, continuous position finding with high temporal resolution can firstly be performed until the supply voltage has dropped to a critical value. At a low remaining supply voltage, a certain basic locating capability or a minimum locating time, respectively, is ensured by switching to discontinuous data transmission.

The locating module can determine the position of the protection module, for example, via GPS-based locating or radio cell locating. However, any other locating technology can be used. However, locating at sea or in remote regions should preferably also be possible. Position data can be two- or three-dimensional position data and comprise both static and time-variable position data when the object is moved. In consequence, the locating module can be capable of determining the track of an object, i.e. the movement of an object over a number of locations. In addition, the position data do not necessarily need to be absolute position data. If a reference point is specified, relative position data can also be determined. A reference point which may also be moved can have a further locating module.

The communication unit of the protection module can send data, especially position data, to the monitoring device. The communication is preferably wireless but can also take place by means of wire-based technologies. The protection module and the monitoring device can thus be connected to one another wirelessly or in a wire-connected manner and can communicate with one another not only unidirectionally but also bidirectionally. In an advantageous exemplary embodiment, the communication unit of the protection module has the required means for USB/GSM/GPRS/UMTS- and/or WLAN-based data exchange such as, for example, corresponding transmitting and receiving devices and connections. Incidentally, data are understood to be any type of information, e.g. position data, sensor data, identification data, alarm signals, instructions, etc.

In one preferred embodiment, the protection module is constructed in such a manner that it is adapted to the object to be monitored in its design and/or in its extent. By this means, the protection module can be mixed inconspicuously among the objects to monitored. The protection module can possibly also be hidden in a product packaging or in the product itself. As an alternative the protection module can be attached inconspicuously to a product or camouflaged as a part of the latter. If it is intended, for example, to monitor a transportation of cigarettes, the protection module can be of such a size that it can be hidden in a cigarette packet of a carton of cigarettes which, in turn, is located among many cartons, for example on a pallet.

Furthermore, a system for monitoring one or more objects is proposed which comprises at least one protection module and at least one monitoring device. The monitoring device can comprise a computer, a server, a server network, a PDA or a mobile telephone etc. The protection module can be designed in accordance with one of the embodiments described above and can be placed into an alarm state by an alarm signal, in which state it sends data to the monitoring device. This data preferably comprise position data which are determined by the locating module of the protection module. The monitoring device can compare the received position data with one another or with predetermined position data. Predetermined position data can comprise, for example, position data sent by other protection devices, stored in the monitoring device and/or predetermined by a user. In the case of a deviation by more than a predetermined value, an alarm signal is then sent to at least one of the protection modules and the protection module, as a result, is placed into the alarm state.

Additionally, it is preferably possible, via the or by the monitoring device, to adapt a transmitting interval, perform configuration changes of the protection module and request data from the protection module such as position data or data from any sensors of the protection module.

In a preferred exemplary embodiment, the system can have further protection devices. For example, the system can also be embedded or integrated in another conventional monitoring system. Preferably, several protection modules can be mounted on the object to be monitored or on several objects to be monitored, each of these protection modules sending position data to the monitoring device in an active state. In this context, the transmitting interval can be greater in the active state than the alarm interval in the alarm state. This reduces the amount of data to be sent and to be processed, on the one hand, and makes it possible to save power, on the other hand. This exemplary embodiment is especially advantageous if a transportation of a multiplicity of objects is involved which have the same destination. These can also be objects which belong together in some form but which are transported packaged separately from one another. This makes it possible to ensure that neither one nor the other generic type is lost.

A particularly secure embodiment of the system according to the invention also comprises a security lock by means of which a room can be closed in which the at least one object to be monitored is stored, which is additionally provided with at least one protection module. The security lock is preferably suitable for conveying at least one alarm state to the monitoring device and/or to the at least one protection module. The room, which can be closed by means of this security lock can be, for example, a transport container, a container, a truck superstructure, a box or the like. However, in addition to the mobile containers, the room also includes immobile warehouses, strong rooms and other security storage rooms.

The security lock is preferably connected wirelessly or in a wire-connected manner to the protection module and/or to the monitoring device for uni- or bidirectional communication. In a particularly flexible and secure embodiment, each element of the system, i.e. the security lock, the at least one protection module and the monitoring device can exchange data with any other element. In some embodiments, it may be advantageous, however, not to implement some of these possible connections.

In a preferred embodiment of the system, the security lock is connected communicatively to the protection module and can place the protection module into the alarm state due to an alarm signal. If the security lock detects manipulation or alerting sensor values of any sensors of the security lock or of the container, the security lock can transmit an alarm signal to the monitoring device and from there to the protection module and/or directly to the protection module. A redundant signal transmission via the monitoring device and directly to the protection module ensures that no alarm signal is lost e.g. due to connection disturbances.

In addition, the security lock can also be capable of being placed into an alarm state. In this case, the monitoring device can place the protection module and/or the security lock into the alarm state due to an alarm signal when the monitoring device detects a contingency or a contingency is defined by a user.

Advantageously, the security lock also has a locating module. The security lock and the protection module can thus send their respective position data to the monitoring device in an active state. When both the security lock and the protection module are sending, the same transmitting interval is preferably used and/or transmission is simultaneous. If the security lock or the protection module has sensors, e.g. temperature, humidity, acceleration, pressure, filling level, gas, light or inclination sensors, the corresponding sensor data, a clock time and/or the date can be sent to the monitoring device instead or in addition to the position data. In addition, the transmitting intervals can be adjustable or adapted to external conditions in the active state and in the alarm state via the monitoring device. If the monitoring device receives position data both from the security lock and from the protection module, the monitoring device can compare the received position data with one another or with predetermined position data. In the case of a deviation which exceeds a critical value, at least the protection module, but preferably also the security lock can then be placed into the alarm state. By means of such an embodiment of the system according to the invention, the collocating of the protection module attached to the objects and the security lock mounted at the room is monitored, for example, so that the objects to be monitored cannot be removed unnoticed out of the room closed by the security lock. This means that even if the room or the security lock is opened without triggering an alarm, e.g. by an authorized person, the objects are additionally protected by the condition of collocating or by coupling the position of protection module and security lock.

Furthermore, a method for monitoring an object provided with a protection module is specified which comprises the following steps: when the protection module receives an alarm signal, it is placed into an alarm state. In this alarm state, the protection module sends position data which are determined by a locating module of the protection module, to a monitoring device. The position data are preferably transmitted continuously in a type of continuous locating mode. As an alternative, the position data can also be transmitted in an alarm interval. The protection module, like the monitoring device, can be designed in accordance with one of the embodiments described above.

The above features can be implemented in any combination in an exemplary embodiment of a protection module, a system or a method.

DETAILED DESCRIPTION OF THE INVENTION

Figure 1:
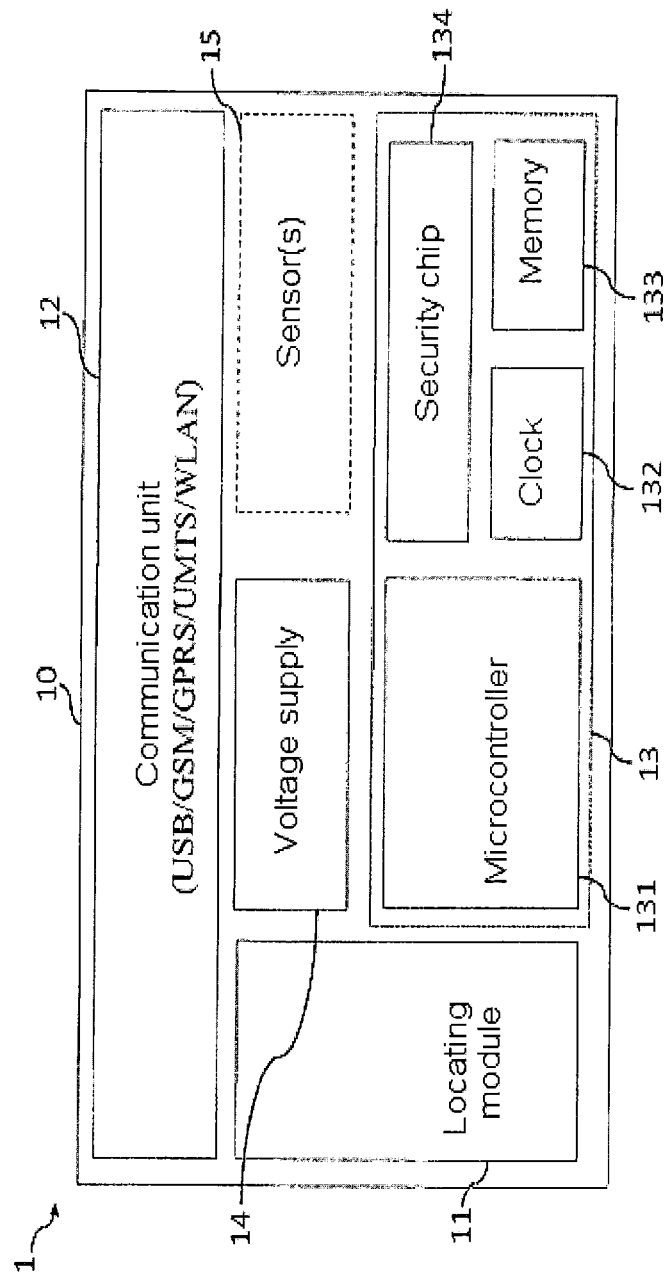
FIG. 1 shows the structure of a protection module according to the invention.

FIG. 1 shows the structure of a protection module according to the invention. The protection module 1 comprises at least one locating module 11 and one communication unit 12. The locating module 11 can be, for example, a Telit locating module with GSM communication, antenna and battery and is suitable for determining a position and generating position data from this. The position data can be two-dimensional position data which specify the position on the earth's surface, or three-dimensional position data which additionally also specify the height above the earth's surface. The locating can be done via GPS or radio cell location, but it may also be possible to switch between both locating methods.

The communication unit 12 is suitable for transmitting or receiving data on the basis of USB, GSM, GPRS, UMTS and/or WLAN. For this purpose, the communication unit 12 has, for example, a mobile radio antenna. The protection module 1 advantageously also has a USB connection via which data can be exchanged and electrical power be supplied. In addition, the firmware of the protection module 1 can be updated via the USB interface and other adjustments, for example the activation, can be performed.

The protection module 1 can have a voltage supply 14 such as an accumulator or a battery which can be charged without removal via the USB interface. As an alternative, an external voltage source can be connected to the protection module 1. The charging state of the voltage source 14 can be indicated, for example, by means of an LED. The autonomous voltage supply 14 of the protection module 1 is advantageously sufficient for at least 5 days with continuous locating (continuous position data transmission to the monitoring device 2). The protection module 1 can also have a key switch for testing the supply voltage. When the key switch is pressed for the supply voltage test, a charging state of the voltage source can be indicated, for example, by means of an LED display.

The protection module 1 can also have a control unit 13 which is suitable for controlling the locating module 11 and the communication unit 12 and any sensors 15. For this purpose, the control unit 13 can comprise a microprocessor or a microcontroller 131. In particular, a sensor 15 can be provided for testing the state of charge. Other sensors 15 are also conceivable such as, for example, temperature, humidity, motion, acceleration, pressure and gas sensors. The sensor data can be interrogated preferably via the communication unit 12 by a user or a monitoring device 2 or are automatically transmitted via the protection module. In addition, a security chip 134 can be provided in the control unit in order to encrypt data to be transmitted or to decrypt received encrypted data. A suitable software-based encryption or protection (MAC) increases the security of the communication between the protection module 1 and the monitoring device 2. In addition, there can be a real-time clock 132 in order to add a time stamp to data to be sent out. Such a time stamp preferably comprises both the date and the clock time. In a preferred exemplary embodiment, there is also a memory 133 in which identification data, access data, configuration data etc. can be stored for the operation of the protection module 1. Such a memory 133 can be implemented by any type of memories, for example ROM, FLASH, EPROM, EEPROM etc.

The protection module 1 also has a housing 10, preferably of plastic which encloses most of the other components of the protection module 1 virtually completely and can be adapted in its design to the objects to be monitored. For example, the protection module can be accommodated in a housing, camouflaged as a cigarette packet. The housing 10 should be inconspicuous and as small as possible so that the protection module 1 can be easily hidden at or in or in the vicinity of the objects to be monitored. The protection module 1 can also have a similar or identical size as the products to be monitored and hidden in a product package.

The protection module 1 can be activated via a user interface (e.g. on button, display, pin pad, etc.) or via a device connected to the protection module 1 via the USB interface. In the active state, the protection module 1 is ready to receive and to transmit. There is possibly also a pilot lamp, e.g. an LED for indicating the operating status of the protection module 1. However, it may also be advantageous to omit any type of noticeable displays and switches on the housing 10 of the protection module 1 in order to be able to better camouflage the protection module 1.

Figure 2B:
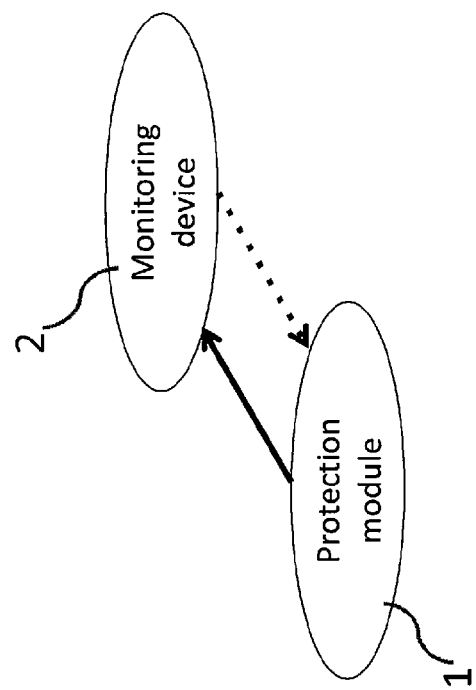
FIG. 2B shows possible transmission paths of data between a protection module and a monitoring device in an alarm state of the protection module.
Figure 2A:
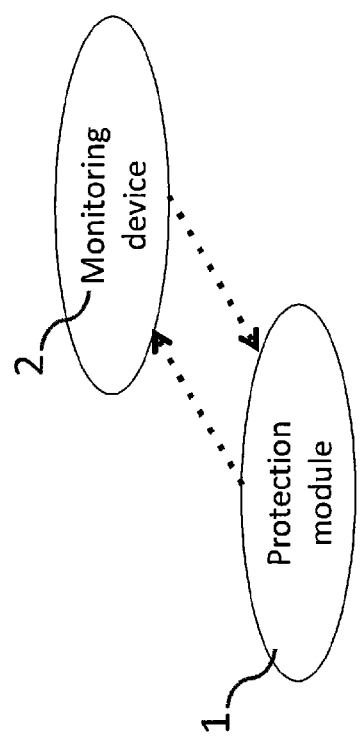
FIG. 2A shows possible transmission paths of data between a protection module and a monitoring device in an active state.

FIG. 2A shows the protection module 1 in the active state and a monitoring device 2. The arrows indicate a possible connection set up for a data transmission. In the active state, the protection module 1 can send data to the monitoring device 2 such as, for example, position data or sensor data. This can take place either at regular time intervals, continuously or incrementally. In the active state, the protection module preferably transmits regularly within large transmitting intervals. The data connection is preferably bidirectional so that the monitoring device 2 can also send commands or information to the protection module 1. Possible connections are indicated by dashed arrows, absolutely necessary connections are indicated by continuous arrows.

FIG. 2B shows the exchange of data between the protection module 1 in the alarm state and the monitoring device 2. In the alarm state of the protection module 1, the protection module 1 sends data either continuously or within an alarm interval to the monitoring device 2. In particular, position data of the protection module 1 are sent to the monitoring device 2 in the alarm state. Additionally, identification data for identifying the protection module 1, time and/or sensor data can also be transmitted. In the alarm state, the protection module 1 preferably first sends data continuously to the monitoring device 2 until the state of charge of the voltage supply 14 of the protection module 1 has dropped to a critical value. After that, the protection module 1 switches to a power-saving transmit mode in which the data are now only sent to the monitoring device 2 within a predetermined alarm interval. If the protection module 1 sends data to the monitoring device 2 also in an active state (normal state), the transmit interval in the alarm state (alarm interval) is preferably shorter than the transmit interval in the active state. If the protection module 1 sends position data to the monitoring device 2 also in the active state, the monitoring device 2 can compare the received position data with predetermined position data. These predetermined position data can either be stored in the monitoring device 2 or other position data supplied to the monitoring device. As well, the position data can relate to a relative location in which the position of the protection module 1 is specified with respect to a reference point. In addition, a user can predetermine position data for the transportation of an object in the monitoring device 2 so that the position data correspond to time-variable position data. As a result, it is possible to monitor both the movement of an object to be monitored from its starting location to its destination and any unauthorized removal of the object to be monitored from a predetermined location. The protection module 1 according to the invention can thus be used for monitoring in transportation, during storage and protective safe keeping.

The configuration of the protection module 1 can be adapted by a user via the monitoring device 2 also during the operation of the protection module 1. For example, the transmitting interval can be adapted in the alarm state or in the active state. Sensor data may also be selectively requested from sensors 15 of the protection module 1. As an alternative, such control and request functions can also be exercised by an authorized user via other devices.

Figure 3:
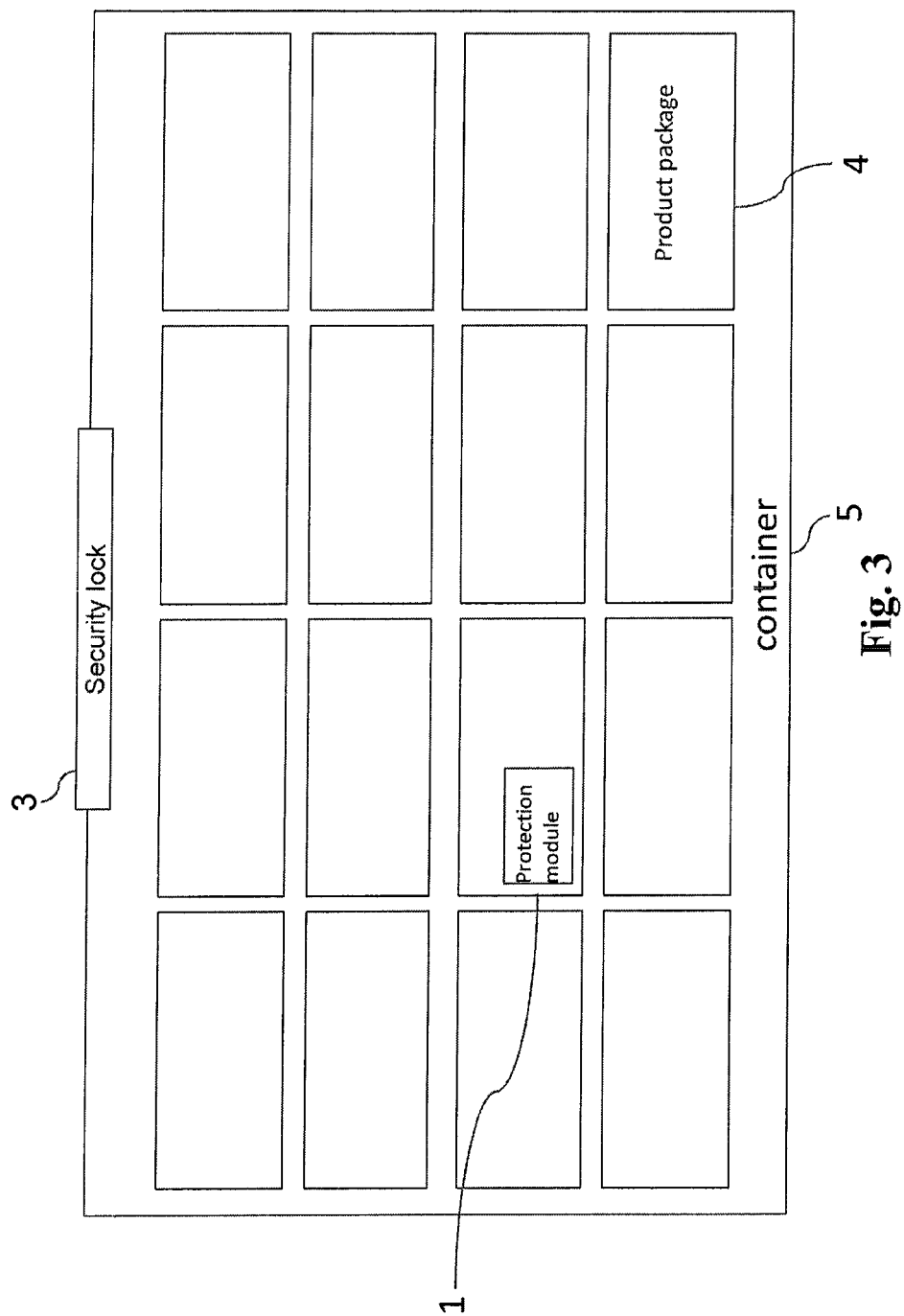
FIG. 3 shows a flow chart for the use of a protection module.

FIG. 3 shows a possible use of a protection module 1 for monitoring a transport. The protection module 1 is hidden in a product package 4. A multiplicity of such product packages 4 are stored in a container 5 which can be locked with a security lock 3. In this manner, the fake or the marked product package, respectively, is not noticeable and cannot be easily discovered.

Figure 4:
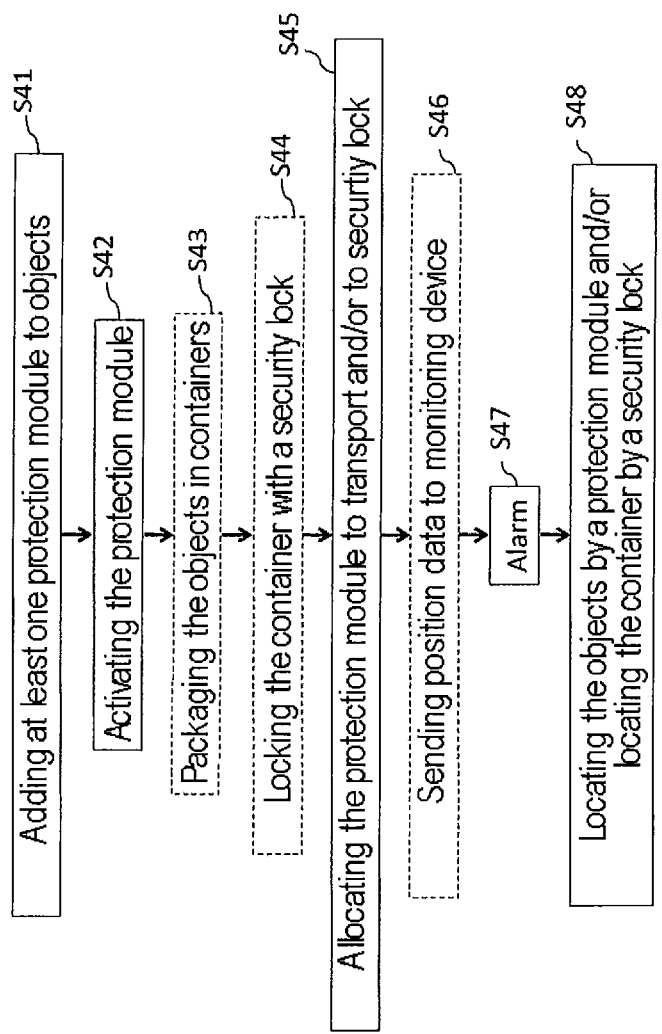
FIG. 4 shows a protection module which is hidden in a room locked by a security lock.

FIG. 4 shows a flow chart for the operation of a protection module according to the invention. In a first step (S41), the user adds the protection module 1 to one or to a multiplicity of objects to be monitored and activates (S42) the protection module 1. For example, the protection module 1 can be hidden in one of the objects or in the packaging of the objects, mounted inconspicuously on the objects or attached to the packaging of the objects.

The object to be monitored or the multiplicity of objects is possibly subsequently packaged with one or more hidden active protection modules 1 in a container 5 (S43) which may be locked by a security lock 3 (S44). If an electronic security lock 3 is used, the security lock 3 may also have to be activated.

Following this, the protection module 1 is allocated to a transport and/or to a security lock 3 (S45). This can be done via a user interface in an internet portal which is connected to the monitoring device 2. The user must previously identify himself and can configure the protection module 1 or the process only with authorization by the monitoring device 2. Each protection module 1 can have an identification number by means of which the protection module 1 can be unambiguously allocated. Furthermore, SIM-PIN or/and SIM-PUK can be used. The protection module 1 can be allocated via the monitoring device 2 to a particular process which is defined by the user. For example, the user can predetermine a particular transport route or a particular location from which the object to be monitored must not be removed. When several locatable protection devices are used, the relative position data or maximum distances between these protection devices can also be specified so that the monitoring device 2 compares the position data received by the protection devices with one another and, if the maximum distance is exceeded, triggers an alarm. For example, it can be specified that the object to be monitored, which is provided with the protection module 1, must not leave the container 5 locked with the security lock 3. In addition, transmitting intervals or sensor data interrogations can be configured.

The protection module 1 preferably sends (S46) position data to the monitoring device 2 already in the active state so that rough locating always takes place. If then an alarm is triggered (S47), the protection module 1 receives an alarm signal and is placed into the alarm state. The protection module 1 can receive an alarm signal from the monitoring device 2 and/or also from other protection devices which are authorized for this. In the alarm state, the protection module 1 sends position data continuously or at regular intervals (alarm intervals) to the monitoring device 2. By this means, the object marked by the protection module 1 can be located (S48). If an electronic security lock 3 is used additionally which also has a locating module 11, the container 5 can also be located. The monitoring device 2 receives the locating data from the protection modules 1 and/or from the security lock 3 and can represent these with symbols or various colors on a map. The monitoring device 2 is preferably connected to an alarm system so that responsible persons are immediately notified and/or counter measures are initiated. Such a protection system consisting of a protection module 1 and a monitoring device 2 has the advantage that a thief can be tracked unnoticed. It is important, therefore, to attach the protection module 1 as inconspicuously as possible to the objects to be monitored.

Figure 5:
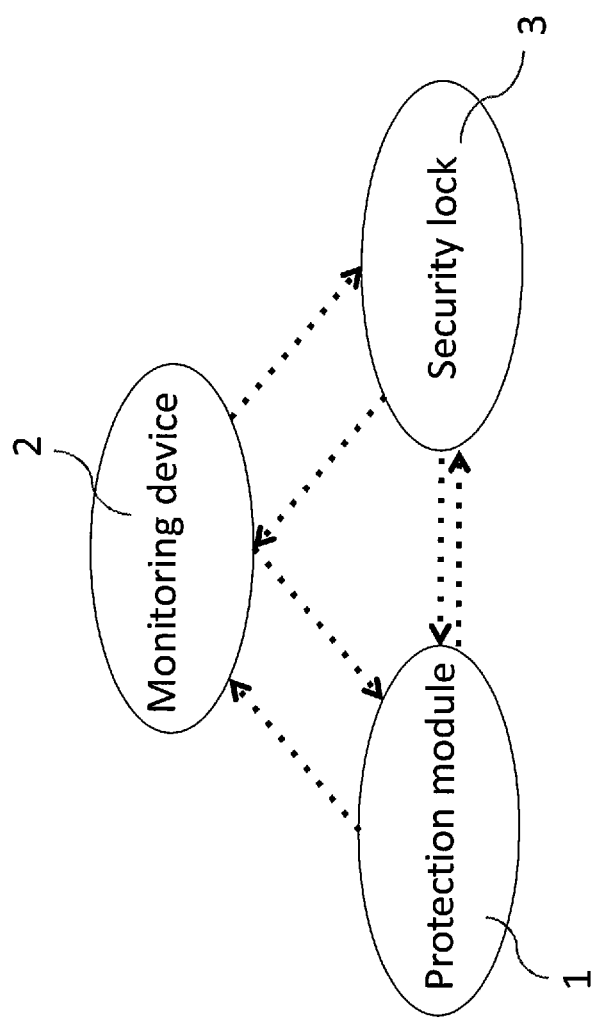
FIG. 5 shows a system for monitoring an object with a protection module, a monitoring device and a security lock.

FIG. 5 shows possible connections of a protection system in the active state which comprises a protection module 1, a monitoring device 2 and a security lock 3. In the active state of the protection module 1 or of the security lock 3, respectively, data do not necessarily need to be transmitted. In a preferred exemplary embodiment, the protection module 1 and/or the security lock 3, however, sends the respective position data to the monitoring device 2 also in the active state. The monitoring device 2 can then compare the received position data with predetermined data and monitor the location of the object to be monitored and of the container 5 provided with the security lock 3. The predetermined data can be position data which a user has stored in the monitoring device 2 when configuring the monitoring. For example, a user can predetermine a transportation route or specify location points which must be reached at a predetermined point in time. As an alternative, a particular area can be predetermined which must not be left by the object to be monitored or by the container 5, respectively. For example, this triggers an alarm when a truck is stolen which transports the objects to be monitored or when the container 5 with the objects to be monitored is stolen from the truck. In this scenario, a missing changing location can also generate a position signal deviating from predetermined position data and trigger an alarm. It is thus possible to perform any type of geofencing.

Figure 6:
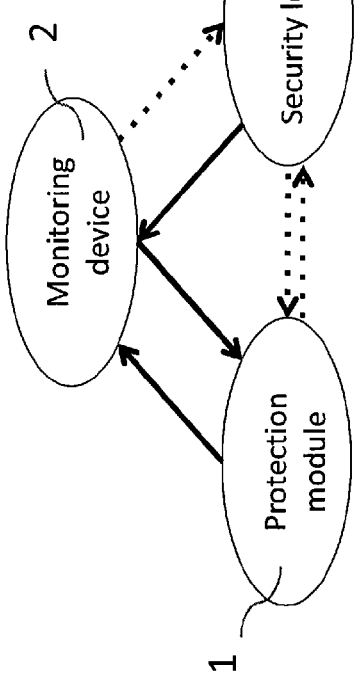
FIG. 6A shows possible transmission paths in the case of an alarm of the security lock.
FIG. 6B shows a flow chart for the situation shown in FIG. 6A.
Figure 6:
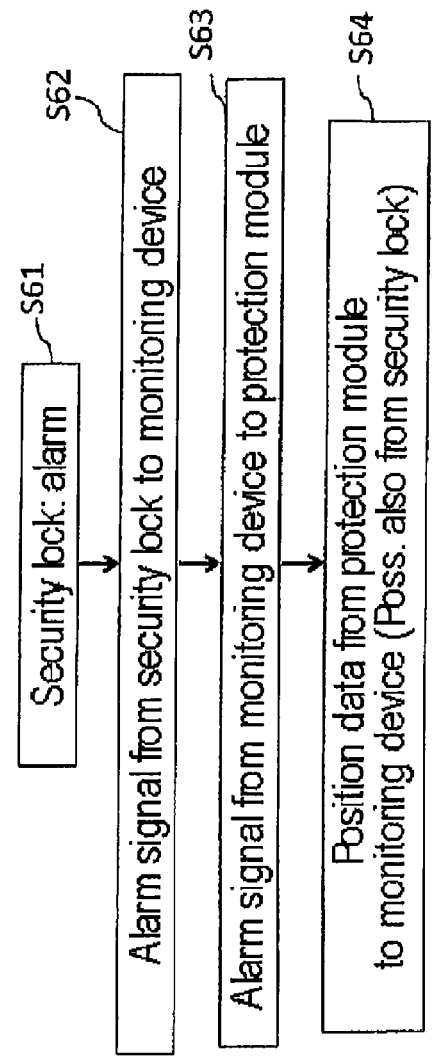

In the text which follows, various alarm situations of the system are described. In FIGS. 6A and 6B, an alarm is triggered in the security lock 3 (S61). The security lock 3 transmits (S62) the alarm signal to the monitoring device 2. The monitoring device 2 thereupon sends (S63) an alarm signal to the at least one protection module 1 which is allocated to the security lock 3 or the same monitoring process, respectively. As a result, the protection module 1 is placed into the alarm state and then sends (S64) its position data to the monitoring device 2 in the alarm interval or continuously. The monitoring device 2 may also receive data from the security lock 3. The monitoring device 2 can indicate the received position data on a map or represent them in a table. The movement of the object to be monitored or of the container 5, respectively, is preferably stored in a memory of the monitoring device 2. Other possible data transmission connections are indicated by dashed arrows between the individual elements of the system.

Figure 7:
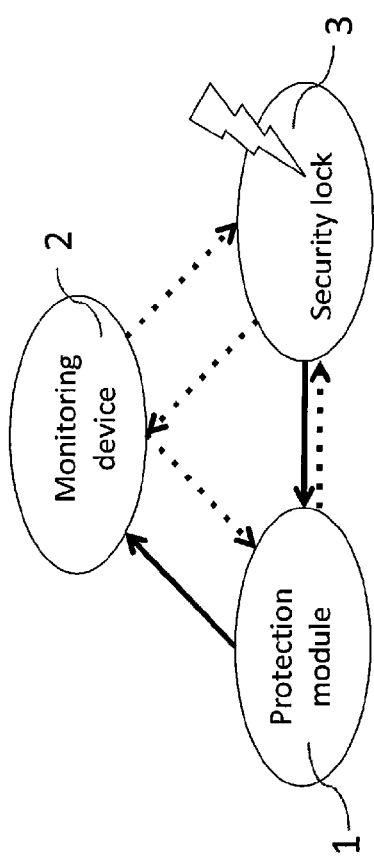
FIG. 7A shows alternative transmission paths in the case of an alarm of the security lock.
FIG. 7B shows a flow chart for the situation shown in FIG. 7A.
Figure 7:
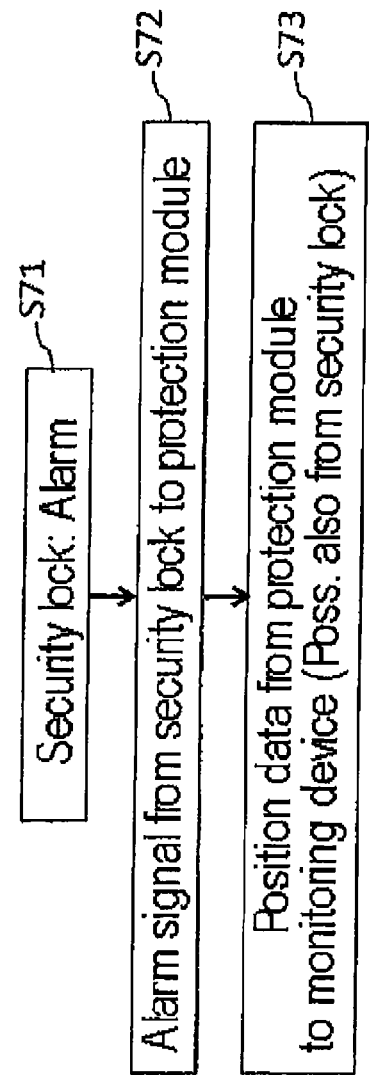

A further possibility for data transmission in an alarm situation is shown in FIGS. 7A and 7B. An alarm is again triggered in the security lock 3 (S71). This time the security lock 3 sends (S72) the alarm signal directly at least to the protection module 1 and places it into the alarm state. The protection module 1 thereupon sends (S73) its position data to the monitoring device 2 continuously or in the alarm interval. The monitoring device 2 is preferably informed about the alarm state by the data transmission from the protection module 1 and initiates predefined measures. In addition, the monitoring device 2 can display, store and/or send out to various addressees the received position data.

Figure 8:
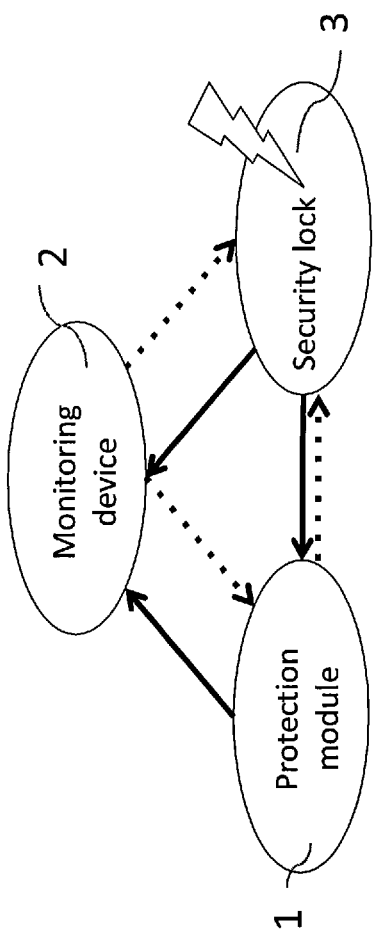
FIG. 8A shows further alternative transmission paths in the case of an alarm of the security lock.
FIG. 8B shows a flow chart for the situation shown in FIG. 8A.
Figure 8:
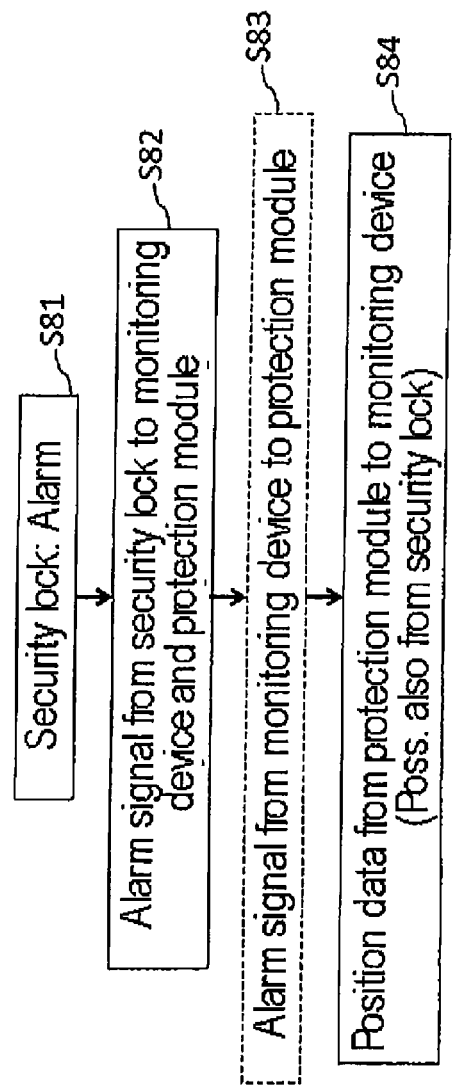

A further possibility with increased security due to redundant signal transmission is shown in FIGS. 8A and 8B. In this alternative, the security lock 3, on triggering (S81) an alarm, sends (S82) the alarm signal both to the protection module 1 and to the monitoring device 2. The protection module 1 is placed into the alarm state and sends (S84) at least position data to the monitoring device 2 continuously or in the alarm interval. The monitoring device 2 may transmit a (S83) a further alarm signal to the protection module 1 for the sake of security. The redundant signal transmission ensures that no alarm signal is lost and possible problems of connection, for example between security lock 3 and monitoring device 2 or security lock 3 and protection module 1 remain without consequences.

Figure 9A:
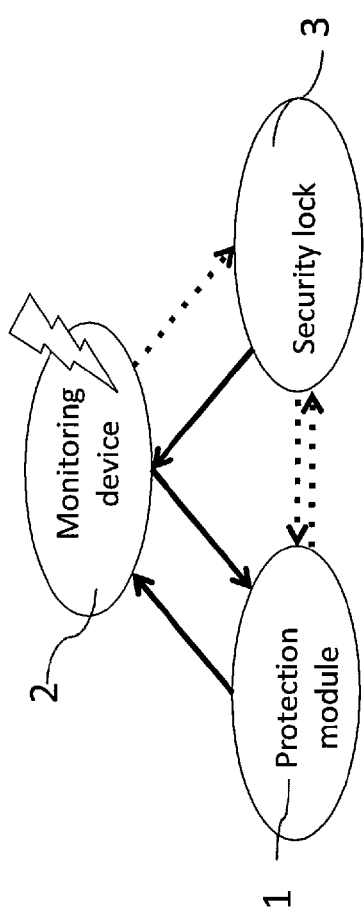
FIG. 9A shows possible transmission paths in the case of an alarm of the monitoring device.
Figure 9B:
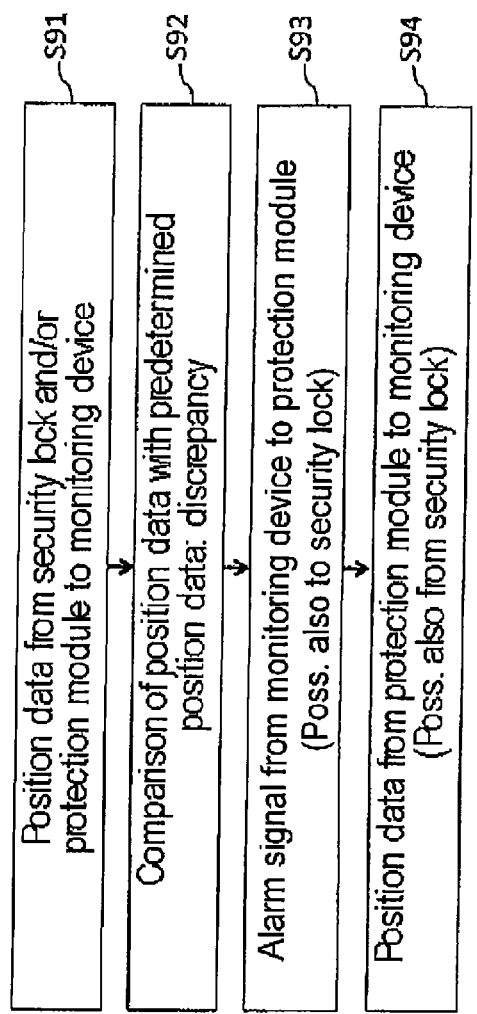
FIG. 9B shows a flow chart with respect to the situation shown in 9A.

A further alarm situation is shown in FIGS. 9A and 9B. The alarm is triggered here in the monitoring device 2. For example, the monitoring device 2 has received (S91) position data from the protection module 1 and/or from the security lock 3 which, on comparison (S92), deviate from predetermined data. As an alternative, the alarm can also be triggered by a user via the monitoring device 2. The monitoring device 2 sends (S93) an alarm signal at least to the protection module 1 but possibly also to the security lock 3 as a result of which an alarm state is activated in each case. In the alarm state, the protection module 1 again sends (S94) position data to the monitoring device 2 so that locating can take place and counter measures initiated.

Figure 10:
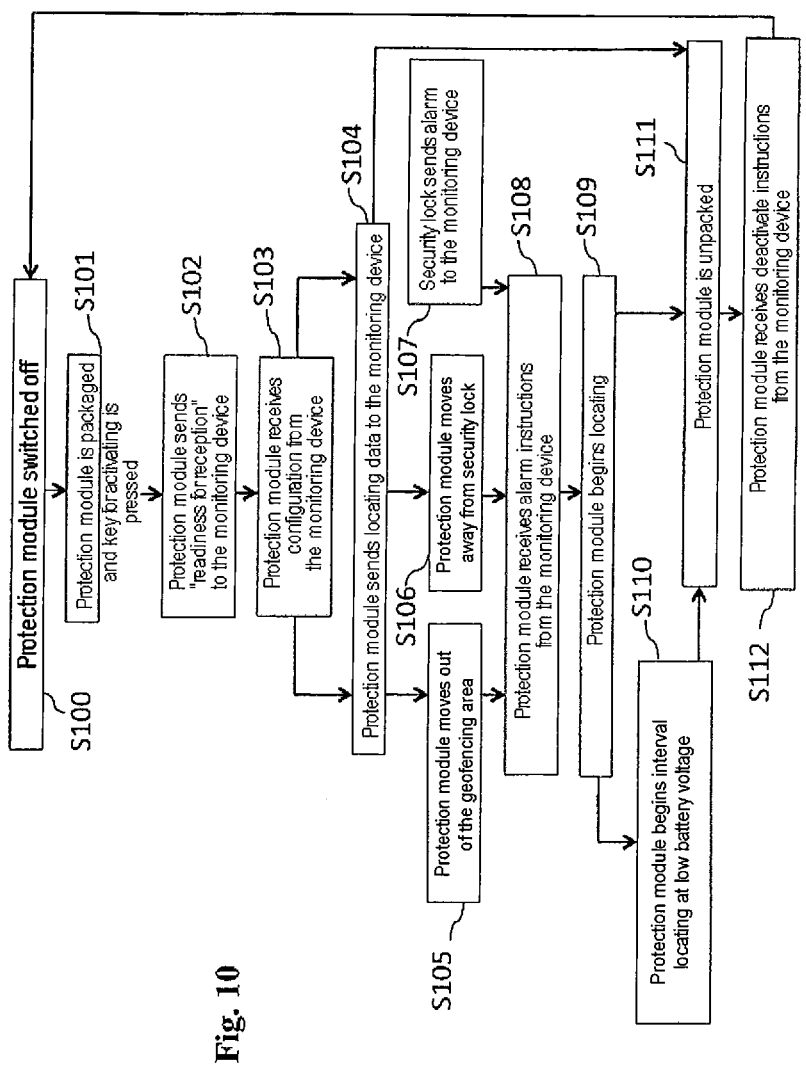
FIG. 10 shows a detailed flow chart with respect to operating a protection module according to the invention.

FIG. 10 shows a detailed flow chart of a protection module 1 according to the invention. The protection module 1 is initially switched off (S100) and is activated by the user via an on button (S101) before packaging. The protection module 1 can then send (S102) readiness for reception to the monitoring device 2. This signal can also contain identification data of the protection module 1 such as, for example, an identification number. The protection module 1 may receive (S103) configuration data from the monitoring device 2 such as, for example, user-defined transmit intervals for the active state and the alarm state. The protection module 1 preferably sends (S104) its position or locating data to the monitoring device 2 already in the active state, the transmitting interval being preferably greater in the active state than in the alarm state. As an alternative, the monitoring device 2 can also request data e.g. position data or sensor data from the protection module 1 in user-defined intervals. If, for example, the position data sent by the protection module 1 to the monitoring device 2 in the active state deviate from predetermined data by a certain value, an alarm is triggered. As an alternative, an alarm can be triggered when sensor data deviate from predetermined values or when the monitoring device 2 finds that the protection module 1 is moving out of the geofencing area (S105). Further possibilities for triggering an alarm would be that a security lock 3 reports an alarm to the monitoring device 2 which forwards the alarm signal to the protection module 1, or that a user-defined alarm is detected in the monitoring device 2 or that the protection module 1 is moving away from a security lock 3 (S106). If then an alarm is triggered, the protection module 1 receives an alarm signal. After receiving the alarm signal, the protection module 1 sends (S109) its position data preferably continuously to the monitoring device 2. If the supply voltage of the protection module 1 is monitored, it is possible to switch from continuous locating to interval locating (S110) at a lower supply voltage. In the case of interval locating, the protection module 1 sends to the monitoring device 2 only in the predetermined alarm interval. If no alarm is triggered and the protection module 1 is unpacked by an authorized user (S111), the authorized user can deactivate the protection module 1 via the monitoring device 2 (S112), the monitoring device 2 sending a deactivate command to the protection module 1. By this means, the protection module 1 is switched off completely immediately or after a predetermined latency period.

The protection module 1 according to the invention provides for protection against misuse, manipulation and theft with comparatively advantageous costs. The protection module 1 is suitable both for transportation on land and at sea and only mobile radio or GPS reception is needed. In addition, culprit tracking is more successful since the stolen goods can be located. Discovery by the unauthorized person is very improbable especially due to the fact that a protection module 1 can be camouflaged as a product so that it can be tracked unnoticed. In addition, the monitoring can be adapted to individual requirements, for example sensors can be monitored, continuous locating can be selected, the protection module can be combined with other security devices etc. For example, a two-stage security and locating solution can be implemented by combining the protection module 1 according to the invention with an intelligent electronic security lock 3: if the security lock 3 is prized open, an alarm is triggered (so-called real-time alarm function) and first intervention steps are triggered, e.g. alerting the police. Following this, the protection module 1, now placed into the alarm state, leads directly to the thief or to the stolen goods. As a result, the high costs of an accompanying security transport can be saved. In addition, the efficient and reliable tracking will discourage future transgressions.

The invention claimed is:

1. A system for monitoring at least one object, comprising:
   a monitoring device (2); and
   at least one first protection module (1) for attachment to an object to be monitored, wherein the first protection module (1) has a locating module (11) for determining position data and for transmitting the position data to the monitoring device (2), wherein the first protection module (1) can be placed into an alarm state by an alarm signal and is configured to send position data to the monitoring device (2) in the alarm state in a particular alarm interval or continuously, and
   a second protection module (1) and/or security lock (3), wherein the object to be monitored having the first protection module (1) attached is located a room (5) lockable by the security lock (3);
   wherein the monitoring device (2) receives position data of the security lock (3) and of the first protection module (1) and/or position data of the first protection module (1)

and of the second protection module (1), wherein when finding a predetermined discrepancy of the position data from one another and/or from predetermined position data by more than a predetermined value places at least the first protection module (1) into the alarm state.

2. The system as claimed in claim 1, wherein at least two protection modules (1) send position data to the monitoring device (2) in an active state and the monitoring device (2) places at least one of the protection modules (1) into the alarm state due to the alarm signal in the case of a deviation of the received position data from one another and/or from predetermined position data by more than a predetermined value.

3. The system as claimed in claim 1, wherein the security lock (3) can be communicatively connected unidirectionally or bidirectionally wirelessly or in a wire-connected manner to the first protection module (1) and/or to the monitoring device (2).

4. The system as claimed in claim 1, wherein the security lock (3) is suitable for placing the protection module (1) into the alarm state due to an alarm signal.

5. The system as claimed in claim 1, wherein the security lock (3) comprises a locating module, wherein the security lock (3) and/or the first protection module (1), in an active state, send their respective position data to the monitoring device (2) in one and the same interval.

6. The system as claimed in claim 5, wherein the interval for sending the position data in the active state is greater than the alarm interval.

7. A method for monitoring an object, wherein the object is provided with a first protection module, comprising:
 sending of position data of the first protection module (1) to a monitoring device (2), the position data being determined by a location module (11) of the first protection module (1);
 sending of position data of a security lock (3) and of a second protection module (1) to a monitoring device (2), wherein the object to be monitored having the first protection module (1) attached is located a room (5) which can be locked by the security lock (3);
 finding a predetermined discrepancy of the position data send by the first protection module (1) and the security lock and/or by the first protection module (1) and the second protection module (1) from one another and/or from predetermined position data by more than a predetermined value
 reception (S63, S72, S82, S93, S108) of an alarm signal from the monitoring device (2) via the first protection module (1);
 activating an alarm state of the first protection module (1); and
 sending (S64, S73, S84, S94, S109) position data which are determined by the locating module (11) of the first protection module (1) in a particular alarm interval or continuously from the first protection module (1) to a monitoring device (2).

\* \* \* \* \*